United States Patent Office 3,068,293
Patented Dec. 11, 1962

3,068,293
PROCESS FOR THE MANUFACTURE OF PRIMARY ORGANIC PHOSPHINES
Hermann Zorn and Friedrich Pass, both of Vienna, Austria, and Erwin Steininger, Schriesheim an der Bergstrasse, Germany, assignors to Farbwerke Hoechst Aktiengesellschaft vormals Meister Lucius & Brüning, Frankfurt am Main, Germany, a corporation of Germany
No Drawing. Filed June 21, 1960, Ser. No. 37,561
Claims priority, application Germany June 23, 1959
9 Claims. (Cl. 260—606.5)

The present invention relates to a process for the manufacture of primary organic phosphines.

It is known to prepare alkyl-phosphines by different methods. It is possible, for example, to disproportionate alkyl derivatives of hypophosphorous acid, which are accessible with great difficulty only, according to the equation:

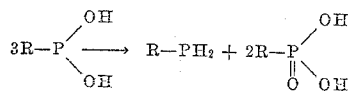

The theoretically obtainable yield of primary alkyl phosphine R—PH$_2$ amounts in this reaction to 33.3% and is in practice in most cases considerably smaller.

When phosphonium iodide is reacted with alkyl iodide and zinc oxide alkyl-phosphines are likewise obtained in a yield of about 30% only in the form of a mixture of all three phosphines.

Furthermore alkyl-phosphines can be produced according to the equation

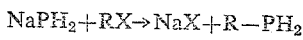

The extremely sensitive monosodium-phosphine used as starting material can only be applied in liquid ammonia or together with triphenyl-methyl sodium in the high dilution of 1/10 mol per liter. In the reaction a yield of 50% can only be obtained with alkyl halides of low molecular weight, while alkyl halides of higher molecular weight (for example hexyl halide) give a smaller yield. The phosphine of the highest molecular weight hitherto prepared by this method, i.e. the octyl-phosphine C$_8$H$_{17}$—PH$_2$, is only obtained in a yield of a few percent. When hydrogen phosphide is reacted with olefins in the presence of acid catalysts under high pressure (100 atmospheres gauge) a mixture of all possible phosphines is formed in a yield of about 67%. Said reaction mixture only contains small amounts of primary phosphines.

Thus it was hitherto not possible to obtain good yields of pure primary organic phosphines by one of the known methods.

It has now been found that primary organic phosphines can be produced in a high purity and—if the alkyl group contains more than 4 carbon atoms—also in a very good yield, when known complex compounds formed under suitable conditions from a Lewis acid, preferably aluminum chloride, and hydrogen phosphide, are reacted in an exothermal reaction with mono- or dihalogenated hydrocarbons in which the halogen atom is bound to an aliphatic carbon atom and from the reaction products thus obtained the primary organic phosphines are isolated from the organic phase after hydrolytic decomposition. Secondary phosphines are formed only in an inferior amount as by-products.

The process of the invention is carried out in a manner such that a melt of a complex compound produced at a temperature in the range from about 20° C. to about 150° C. in known manner from a Lewis acid, preferably anhydrous aluminum chloride, and hydrogen phosphide in a molar ratio of 1:1 is admixed in an inert gas atmosphere, such as nitrogen, carbon dioxide or noble gases, with a mono- or dihalogenated hydrocarbon in which the halogen atom is bound to an aliphatic carbon atom, at a rate such that by the evolved reaction heat a reaction temperature is maintained at which the reaction mixture is present in the liquid phase.

In the reaction of the AlCl$_3$.PH$_3$ complex compound the reaction temperature suitably ranges between the melting point of the complex compound of 80° C. and 130° C. Substantial differences in the yield have not been observed in said temperature range. When the reaction has started the melting point of the complex compound is reduced and the further reaction can then be carried out also at 50–60° C. Inert solvents may concomitantly be used without special advantages being obtained since the complex compounds are in most cases sparingly soluble in organic solvents. The application of superatmospheric pressure may be of advantage, above all when the organic halide is gaseous at the melting temperature of the complex compound, even if the splitting off of gaseous hydrogen chloride is hindered by superatmospheric pressure.

As Lewis acids there are mentioned, in addition to aluminum chloride, other aluminum halides such as aluminum bromide, and furthermore zinc chloride, iron trichloride and boron-trifluoride.

Suitable monohalogenated hydrocarbons are alkyl halides, for example methyl, ethyl, propyl, isopropyl, primary, secondary and tertiary butyl, primary isobutyl, amyl, hexyl, octyl, nonyl, decyl, dodecyl, tetradecyl, hexadecyl, and octadecyl chlorides; cycloalkyl halides, for example, cyclopentyl chloride and cyclohexyl chloride; aralkyl halides, for example benzyl chloride, and the corresponding bromides and iodides. After the addition of about 75–80% of the stoichiometric amount of organic halide required for the formation of the primary organic phosphine; the light yellow reaction mixture becomes dark brown while foaming and the temperature decreases indicating the end of the reaction. The reaction mixture formed which is liquid at room temperature is decomposed in an inert gas atmosphere with ice water and hydrochloric acid, the organic phase is separated and the formed primary phosphine is purified by distillation.

As monohalogenated hydrocarbons are suitable halides in which the organic component represents a straight chain or branched aliphatic hydrocarbon radical and the halogen atom is bound to a primary, secondary or tertiary carbon atom, or an alicyclic or aralkyl radical. Chlorides and bromides are preferred since iodides give small yields of primary phosphines on account of secondary reactions.

Alternatively, alkylene dihalides, for example, 1,10-decamethylene dibromide, and analogous products can be used, in this case bifunctional primary phosphines being obtained.

The following examples serve to illustrate the invention but they are not intended to limit it thereto.

*Example 1*

A suitable reaction vessel was charged with 3 mols (325 grams) of pulverized, anhydrous aluminum chloride and, after having carefully scavenged with nitrogen which is free from oxygen, hydrogen phosphide was introduced at 75–80° C. while stirring and at a rate of about 18 liters per hour. It has proved advantageous to heat the reaction mixture near the end of the reaction to 82° C. and repeatedly to cool by several degrees for a short time in order to enable the formed complex compound to crystallize out from the melt. Thus the absorption of hydrogen phosphide was increased. As soon as the reaction mixture has melted at 82° C. and crystallization set in to a considerable extent at 80° C. the absorption of hydrogen phosphide was terminated. The hydrogen phosphide was preferably produced from aluminum phosphide by decomposition with dilute acid.

1-chlorobutane was dropped, while vigorously stirring at 75–80° C., into 3 mols of the aluminum chloride/hydrogen phosphide complex compound thus obtained. The 1-chlorobutane was added at a rate such that the temperature was maintained by the evolved reaction heat. Within 2½ hours 2.4 mols (80% of the theoretic amount required for the monosubstitution) were added. The light yellow reaction mixture now turned dark brown with the formation of foam and simultaneously no more heat was evolved on dropping in the alkyl halide, so that the addition was interrupted. The reaction mixture was then slowly decomposed, while stirring well in a flask filled with nitrogen, with 1–1½ kilograms of ice and about 50–80 cc. of concentrated hydrochloric acid. A water-insoluble upper layer separated which, after having been separated, dried and distilled, yielded 89 grams (37% of the theory, calculated on the alkyl halide used) of n-butyl-phosphine having a boiling point of 75.5° C. under a pressure of 732 mm. of mercury; $n_D^{20}=1.4372$.

As by-product 24 grams of di-n-butyl-phosphine (16% of the theory) were obtained having a boiling point of 167° C. under a pressure of 732 mm. of mercury.

*Example 2*

1.81 mols (72.5%) of n-decyl bromide were introduced as described in Example 1 within 1½ hours into 2½ mols of the aluminum chloride/hydrogen phosphide complex compound prepared in known manner. After having worked up the reaction mixture, 215 grams of pure n-decyl-phosphine (68.5% of the theory) were obtained having a boiling point of 65–67° C. under a pressure of 3 mm. of mercury; $n_D^{20}=1.4591$.

*Example 3*

1.67 mols of n-hexadecyl chloride (83.5%) were added as described in Example 1 within 2 hours to 2 mols of the aluminum chloride/hydrogen phosphide complex compound and the reaction mixture was worked up in known manner. 353 grams of n-hexadecyl-phosphine were obtained (82% of the theory) having a boiling point of 169° C. under a pressure of 7 mm. of mercury; $n_D^{20}=1.4635$.

*Example 4*

3 mols of the aluminum chloride/hydrogen phosphide complex compound were reacted as described in Example 1 within 2 hours with 2.1 mols (70%) of tertiary butyl chloride. The yield of tertiary butyl-phosphine amounted to 1.05 mols (50% of the theory). The product had a boiling point of 60–62° C.; $n_D^{20}=1.4231$.

*Example 5*

2.5 mols of the aluminum chloride/hydrogen phosphide complex compound were reacted as described in Example 1 within 2 hours with 1.54 mols (61%) of cyclohexyl chloride. 50 grams (0.425 mol=27.6% of the theory) of cyclohexyl-phosphine were obtained having a boiling point of 54–57° C. under a pressure of 50 mm. of mercury; $n_D^{20}=1.4862$.

*Example 6*

4 mols of the $AlCl_3 \cdot PH_3$ complex compound were reacted within 2 hours at 90° C. with 3.4 mols of n-hexyl bromide. After having worked up as described in Example 1, 312 grams (78% of the theory) of pure n-hexyl phosphine $C_6H_{13}$—$PH_2$ were obtained having a boiling point of 127.5° C. under a pressure of 748 m. of mercury; $n_D^{20}=1.4485$.

*Example 7*

The $AlCl_3 \cdot PH_3$ complex compound was reacted as described in the preceding examples with 0.67 mol of 1-butyl iodide. Monobutyl-phosphine having a boiling point of 76° C. and a refractive index $n_D^{20}$ of 1.4372 was obtained in a yield of 37% of the theory.

*Example 8*

5 mols of the $AlCl_3 \cdot PH_3$ complex compound were reacted at 80–100° C. with 2.5 mols of 1,10-decane dibromide which was diluted with 1 liter of petroleum ether. The dilution with a hydrocarbon mixture served to better stir the reaction mixture which would otherwise have a high viscosity. The reaction being complete the reaction mixture was mixed with 1 liter of dilute hydrochloric acid in order to dissolve the aluminum chloride. Two layers were formed. The upper layer consisting of petroleum ether and the reaction product was dried over anhydrous sodium sulfate, the petroleum ether was distilled off and the reaction product was distilled under reduced pressure. The pure 1,10-decamethylene-diphosphine having a boiling point of 75° C. under a pressure of 0.5 mm. of mercury was obtained in a yield of 20%.

*Example 9*

1 mol of the $AlBr_3 \cdot PH_3$ complex compound which had been prepared in the same manner as the complex compound of the aluminum chloride was reacted with 0.86 mol of 1-hexyl bromide at 105–110° C., the melting range of the complex compound. After having worked up, the pure mono-n-hexyl phosphine boiling at 198° C. was obtained in a yield of 38% by weight, calculated on the 1-hexyl bromide used.

In all the other examples the aluminum bromide could be used instead of the aluminum chloride.

*Examples 10–17*

A complex compound having an average content of sublimable portions of at least 90% by weight was prepared as described in Example 1 from aluminum chloride and hydrogen phosphide. Commercial aluminum chloride absorbed on the average 85–90% of the equivalent weight of hydrogen phosphide. The complex compound formed was then immediately reacted at 80° C. with a number of organic halides. At the beginning the reaction was distinctly exothermal. In spite of this fact no additional cooling was required, it was sufficient to regulate the rate of addition of the alkyl halide. The initially light yellow almost transparent addition compound became milky in the course of the reaction and distinctly turned brown while foaming after the addition of the total amount of the organic halide, whereupon the temperature decreased rapidly, even with a further addition of organic halide. The reaction was, therefore, interrupted and the reaction mixture was cautiously decomposed under a protective gas with ice and hydrochloric acid, the organic phase was separated and processed by distillation.

The results are contained in the following table:

| Ex. | Organic halide used | Molar ratio AlCl₃·PH₃ complex:RX | Yield of pure phosphine in percent of the theory, calculated on RX | Molecular weight and elementary analysis | | Density, $d_4^{20}$ | Refractive index $n_D^{20}$ | Boiling point/ mm. Hg |
|---|---|---|---|---|---|---|---|---|
| | | | | | Found | Calculated | | | |
| 10 | n-Amyl-1-chloride | 3:2.25 | 48 | M.w. | 105 | 104.1 | 0.7796 | 1.4431 | 102/760 |
| | | | | P | 29.6 | 29.75 | | | |
| | | | | C | 57.3 | 57.7 | | | |
| | | | | H | 12.5 | 12.6 | | | |
| 11 | n-Hexyl-1-chloride | 1.3:1 | 55 | M.w. | 119 | 118.2 | 0.7909 | 1.4482 | 128/760 |
| | | | | P | 25.9 | 26.2 | | | |
| | | | | C | 60.6 | 61.0 | | | |
| | | | | H | 12.9 | 12.8 | | | |
| 12 | n-Octyl-1-chloride | 2.5:1.9 | 62 | M.w. | 148 | 146.2 | 0.8082 | 1.4548 | 169/760 |
| | n-Octyl-1-bromide | 2:1.45 | 76 | P | 20.5 | 21.2 | | | |
| | | | | C | 65.1 | 65.7 | | | |
| | | | | H | 13.3 | 13.1 | | | |
| 13 | n-Nonyl-1-chloride | 3:2.15 | 65 | M.w. | 161 | 160.2 | 0.8122 | 1.4571 | 187/760 |
| | | | | P | 19.1 | 19.3 | | | |
| | | | | C | 68.9 | 67.5 | | | |
| | | | | H | 14.1 | 13.2 | | | |
| 14 | n-Dodecyl-1-chloride | 2.5:1.7 | 70 | M.w. | 204 | 202.3 | 0.8227 | 1.4622 | 176/100 |
| | | | | P | 15.6 | 15.3 | | | |
| | | | | C | 72.2 | 71.2 | | | |
| | | | | H | 13.2 | 13.4 | | | |
| 15 | n-C₁₄H₂₉-1-chloride | 2.5:1.8 | 74 | M.w. | 233 | 230.4 | 0.8268 | 1.4638 | 100/199 |
| | | | | P | 13.4 | 13.4 | | | |
| | | | | C | 72.2 | 73.0 | | | |
| | | | | H | 14.0 | 13.6 | | | |
| 16 | n-C₁₈H₃₇-1-chloride | 2.15:1.5 | 83 | M.w. | 285 | 286.5 | 0.8289 | 1.4651 | 204/20 |
| | | | | P | 10.6 | 10.8 | | | |
| | | | | C | 75.6 | 75.5 | | | |
| | | | | H | 13.5 | 13.7 | | | |
| 17 | Cyclopentyl bromide | 1.5:1.27 | 15 | M.w. | 104 | 102.1 | 0.8818 | 1.4899 | 121/760 |
| | | | | P | 30.4 | 30.2 | | | |
| | | | | C | 58.5 | 58.8 | | | |
| | | | | H | 10.6 | 10.9 | | | |

We claim:

1. A process for the manufacture of primary organic phosphines of the group consisting of alkyl phosphines, aralkyl phosphines, alkylene diphosphines and cycloalkyl phosphines which comprises reacting a melt of a complex compound of the formula $AlX_3 \cdot PH_3$, in which X stands for halogen, with a halogenated hydrocarbon of the group consisting of alkyl halides, aralkyl halides, alkylene dihalides and cycloalkyl halides.

2. A process as defined in claim 1 wherein the halogenated hydrocarbon is added to the melt at a rate sufficient to maintain the reaction mixture in a liquid phase.

3. A process as defined in claim 1 wherein the reaction is carried out at a temperature in the range from 50 to 130° C.

4. A process as defined in claim 1 wherein the complex compound is $AlCl_3 \cdot PH_3$.

5. A process as defined in claim 1 wherein the complex compound is $AlBr_3 \cdot PH_3$.

6. A process as defined in claim 1 wherein the halogenated hydrocarbon is an alkyl halide containing 1 to 18 carbon atoms.

7. A process as defined in claim 1 wherein the halogenated hydrocarbon is cyclopentyl chloride.

8. A process as defined in claim 1 wherein the halogenated hydrocarbon is cyclohexyl chloride.

9. A process as defined in claim 1 wherein the halogenated hydrocarbon is alkylene dihalide.

No references cited.